UNITED STATES PATENT OFFICE.

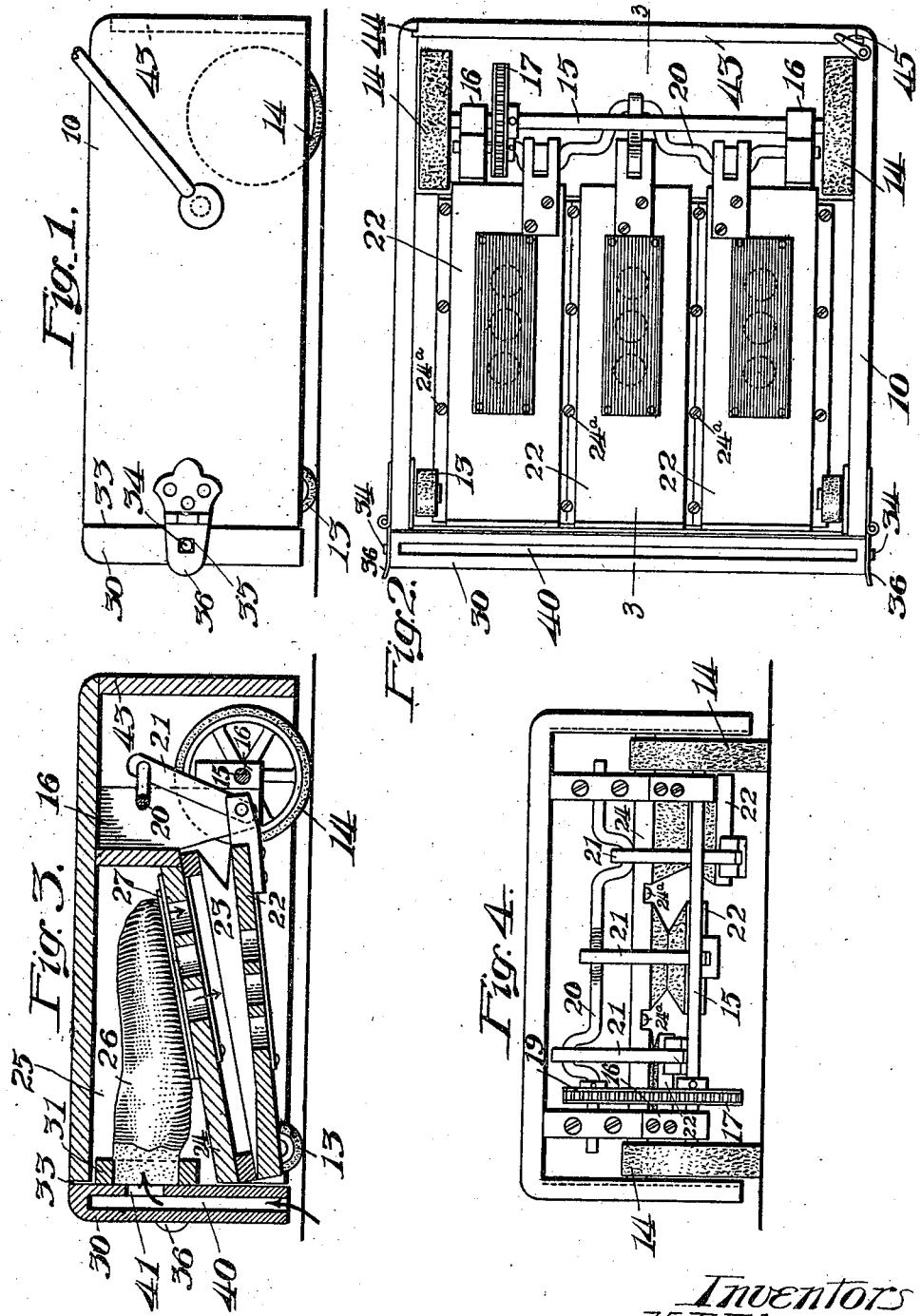

VICTOR J. JOHNSON AND ERIC G. THOREEN, OF WORCESTER, MASSACHUSETTS, ASSIGNORS, BY MESNE ASSIGNMENTS, TO THE TORRINGTON COMPANY, OF TORRINGTON, CONNECTICUT, A CORPORATION OF MAINE.

PNEUMATIC DUST-COLLECTOR.

1,303,819.      Specification of Letters Patent.      Patented May 13, 1919.

Original application filed June 10, 1911, Serial No. 632,411. Renewed June 9, 1916, Serial No. 102,793. Divided and this application filed May 1, 1917. Serial No. 165,781.

*To all whom it may concern:*

Be it known that we, VICTOR J. JOHNSON and ERIC G. THOREEN, citizens of the United States, both residing at Worcester, in the county of Worcester and State of Massachusetts, have invented a new and useful Pneumatic Dust-Collector, of which the following is a specification.

This is a division of our application for patent originally filed June 10, 1911, Serial No. 632,411. Renewed June 9, 1916 and now bearing Serial Number 102,793.

The principal objects of this invention are to provide a construction of pneumatic dust collector in a compact form and convenient relative arrangement of the pneumatics and dust-bag; to provide an expeditious manner of removing and replacing the pneumatics, and to provide other improvements in details of construction as will appear hereinafter.

Reference is to be had to the accompanying drawings, in which—

Figure 1 is a side view of a preferred embodiment of the invention;

Fig. 2 is a bottom plan view thereof;

Fig. 3 is a longitudinal sectional view on the line 3—3 of Fig. 2, and

Fig. 4 is a rear elevation with the back-plate removed.

The invention is shown in a form in which the casing 10 is of a general rectangular form, and of small size. This casing is propelled as usual by bail and handle, or in any other desired way and is provided at the front with casters 13 for supporting the front end. At the rear a pair of rubber tired supporting wheels 14 are arranged fixed on a transverse shaft 15. This shaft is provided with bearings in brackets 16 inside the casing.

In order to provide the desired compactness, and at the same time to secure additional power from the pneumatics by increasing their speed so that the size of the pneumatics can be materially reduced this shaft is provided with a sprocket wheel 17 which by chain drives a smaller sprocket wheel 19 on a shaft 20 located above the wheels. With the cranks of this shaft are connected a plurality of links 21 each extending downwardly from the crank shaft and inwardly so as to escape contact with the shaft 15 as the crank shaft is rotated. The lower end of each link is connected with the movable leaf 22 of a pneumatic 23. These movable leaves are located at the extreme bottom of the casing, being pivoted at the front so that when the pneumatics are expanded these leaves are almost parallel with the floor or supporting surface. Each pneumatic has an individual fixed leaf 24 located at an inclination. These fixed leaves have side ledges and are individually held in position by screws 24$^a$ so that they can be removed very easily. In this construction it will be seen that the movement of the frame over the floor causes a motion of rotation to be transmitted to the crank from the wheels at an increased speed, so that the pneumatics 23 can be made smaller than usual, and yet on account of their increased speed they will afford the necessary power. At the same time this arrangement provides for locating the pneumatics at the bottom of the casing where they can be inspected, removed and repaired simply by turning the casing over and without providing any removable top plate or other means for getting access to them. These are important features, because the supposed necessity of providing an opening in the top of the casing has increased the cost of these machines and increased the time required for their inspection, cleaning, and repair.

Another feature of importance is that the compartment 25 located over the pneumatics for containing the dust-bag 26 is not at the bottom of the casing, but is at the top so that when the dust-bag is removed it is in convenient position as it comes out of the casing and does not tend to fall to the floor and deposit dust back on the floor. In other words it is located where it can be taken out very conveniently. Also by having the bottom slant in the direction shown the bulk of the dust can be deposited near the entrance without clogging the mouth of the dust bag. This dust bag is located on the floor of the chamber 25 and is kept from the ports by means of a screen 27 extending over them. Its mouth is secured to a front plate 30 by means of a removable rectangular frame 31.

The edge of the casing is provided with a packing 33 and the front plate 30 is shown as provided with a pair of spring bars 34 secured at their inner ends and free to move at their outer ends for engaging in slots 35 in pivoted catches 36 on the casing. The front plate is made hollow and is provided with an inlet passage 40 and an outlet passage 41, the latter, of course, opening into the interior of the frame 31.

It is to be observed also that the rear plate 43 is made slidable in ways 44 on the casing and is normally held in position by a light spring or catch 45. This is provided so that the rear of the machine can be inspected and repaired very easily. It does not disfigure the casing in any way.

From what has been said it will be seen that an extremely compact arrangement is secured which will provide all the necessary power and in fact more power than has usually been the case, and that the dust bag is conveniently arranged for removal while the pneumatics are conveniently arranged for inspection, repairs, and cleaning. The movement of the device over the floor rotates the driving wheels 14 and through the speed multiplying mechanism operates the three movable bellows leaves 22 to draw the air in in the direction of the arrows in Fig. 3 through the nozzle into the bag and into the bellows. The dust collects in the bag 26 and has a tendency to settle down in the bag at the lower end thereof.

While we have illustrated and described a preferred embodiment of the invention, we are aware that many modifications can be made therein by any person skilled in the art without departing from the scope of the invention as expressed in the claims.

Therefore we do not wish to be limited to all the details of construction herein shown and described, but what we do claim is:—

1. In a pneumatic carpet cleaner, the combination with a casing having a permanently closed top, of a dust bag compartment located just under said top, the casing having an opening in a vertical margin thereof through which the dust bag can be removed.

2. In a device of the character described, the combination of a casing having a compartment at its top provided with an opening in one of its vertical ends, a dust receptacle in said compartment having its mouth in said opening and a pumping pneumatic on the bottom of said compartment whereby when said dust receptacle is removed through said opening it will come out at a distance above the bottom of the casing.

3. In a device of the character described, the combination of a casing having a compartment at its top provided with a vertical opening in one of its vertical walls, a dust receptacle in said compartment having its mouth in said opening and a pumping pneumatic on the bottom of said compartment, said bottom slanting downwardly toward the bottom of said opening, whereby the dust in said receptacle will tend to settle at a point just inside the opening.

4. In a device of the character described, the combination of a casing having a compartment at its top provided with a vertical opening, a dust receptacle in said compartment having its mouth in said opening and a pumping pneumatic on the bottom of said compartment, said bottom having ports connecting said compartment and pneumatic, and a screen covering said ports to keep the dust receptacle out of them.

In testimony whereof we have hereunto affixed our signatures.

VICTOR J. JOHNSON.
ERIC G. THOREEN.